United States Patent
Cheung et al.

(10) Patent No.: US 7,170,203 B2
(45) Date of Patent: Jan. 30, 2007

(54) TWO-DIMENSIONAL VARIABLE RELUCTANCE PLANAR MOTOR

(75) Inventors: Norbert C. Cheung, Kowloon (HK); Jianfei Pan, Kowloon (HK); Jinming Yang, Kowloon (HK)

(73) Assignee: The Hong Kong Polytechnic University, Kowloon (HK)

( * ) Notice: Subject to any disclaimer, the term of this patent is extended or adjusted under 35 U.S.C. 154(b) by 431 days.

(21) Appl. No.: 10/840,474

(22) Filed: May 6, 2004

(65) Prior Publication Data
US 2005/0248217 A1 Nov. 10, 2005

(51) Int. Cl.
*H02K 41/00* (2006.01)
(52) U.S. Cl. ............ 310/12; 318/649; 318/135
(58) Field of Classification Search .......... 310/12; 318/126, 129, 135, 649
See application file for complete search history.

(56) References Cited

U.S. PATENT DOCUMENTS

| | | | | |
|---|---|---|---|---|
| 4,087,729 A | * | 5/1978 | Yamazaki et al. | 318/601 |
| 5,250,880 A | * | 10/1993 | Chesney et al. | 318/135 |
| 6,486,941 B1 | | 11/2002 | Hazelton et al. | |
| 6,548,917 B2 | | 4/2003 | Hwang et al. | |
| 6,650,079 B2 | | 11/2003 | Binnard | |
| 6,741,332 B2 | * | 5/2004 | Nishi | 355/72 |
| 6,948,367 B2 | * | 9/2005 | Campbell et al. | 73/510 |
| 2003/0102721 A1 | | 6/2003 | Ueta et al. | |

* cited by examiner

*Primary Examiner*—Thanh Lam
(74) *Attorney, Agent, or Firm*—Alix, Yale & Ristas, LLP (57) ABSTRACT

A kind of 2-D variable reluctance planar motor comprises: a stator base combined by a plurality of laminated steel bricks; a moving platform consisting of two rows of spaced coil-shoes; traditional sliding supports to hold said platform above said stator base; two electronic rulers for scaling the real position of the platform; traditional supporting means for holding the platform at a distance above the stator base; computer and software for generating motion command signal to PWM generator; PWM current generator for energizing the coils of the moving platform; when a reference data (the final position of the platform) is input into the computer, the computer will give command to the platform and make it moving; once the moving platform is set in motion, the electronic rules continuously detect and transfer the location data of said platform to the computer; the computer continuously compares the data sent by said rules with reference data and gives command to the platform until said two kinds of data are equal. The planar motor of this invention uses no magnets, no constant air-gap and no accurately manufactured component. The working accuracy can easily reach 0.001 mm and the cost is very low.

8 Claims, 12 Drawing Sheets

TWO-DIMENSIONAL VARIABLE RELUCTANCE PLANAR MOTOR

FIELD OF THE INVENTION

This invention relates to electromagnetic machines, particularly to a prepulsion system, that is a two-dimensional (2-D) variable reluctance planar motor in which a rigid body (the moving platform) is moved on top of a planar surface (the stator base) due to the generation of magnetic flux between these two bodies. The trajectory path of the moving platform is controlled by a computer and can be freely defined by the user. (H02K 41/00)

BACKGROUND OF THE INVENTION

Linear motors and planar motors are now widely used in many manufacturing fields such as components insertion, integrated-circuits fabrication, precision metal-cutting, etc. U.S. 2003/0102721 A1, U.S. Pat. No. 6,650,079 B2, U.S. Pat. No. 6,548,917 B2, U.S. Pat. No. 6,486,941 all have an X-Y table which consists of a plurality of magnets. For always keeping an air-gap between the surface of said magnets and the rotor, the most of said prior arts should be equipped with an air cushion therebetween. None of them can prove to work in very high accuracy (e.g. 0.001 mm) in their patents. In fact, the working accuracy is depending upon the precision of the components such as the magnets, the base structure, the coils layout, etc. In order to achieve high accuracy, the plurality of magnets, the air-gap system, and the base geometry should be manufactured to very accurate sizes. These requirements, together with the complex layout structure, make these designs inflexible and difficult to adapt to the changing environments. For applications with different precisions or travel ranges, the overall motor structure has to be redeveloped.

The stator base of 2-D planar motor in the prior art needs to be crafted from a single slab of steel using high precision metal cutting machines or lasers. Alternatively, they have to "stick" small pieces of permanent magnets together to form a magnetic checker board. There is no mass manufacturing of the stator base. As a result, the overall cost of 2-D variable planar motors becomes prohibitively expensive.

SUMMARY OF THE INVENTION

The object of this invention is to provide a two-dimensional (2-D) variable reluctance planar motor to solve the problem of the complexity of manufacturing the stator base, which hinders the widely spread use of high-performance 2-D planar motors. The motor uses no magnets; it does not have complicated coil arrays; it allows fairly large air gap tolerance (e.g. ±25%) between the moving platform and the stator base; the traveling range is flexible and can be re-configurable. Overall, the production of the said motor does not require high accuracy or difficult manufacturing techniques. The working accuracy of this invention can easily reach 0.001 mm. The overall production cost is very low.

To achieve the above mentioned object, the 2-D variable reluctance planar motor of this invention may comprises: a stator base combined by a plurality of "laminated steel bricks", a moving platform consisting of two rows of spaced coil-shoes, traditional sliding supports used to hold said platform above said stator base, two linear optical encoders used to measure the position of the platform, computer and software for controlling the motion of the said platform, pulse generators and current amplifiers for powering the planar motor.

In other words, a 2-D variable reluctance planar motor according to the present invention comprises:

a stator base combined by a plurality of laminated steel bricks;

a moving platform consisting of two rows of spaced coil-shoes and coils;

traditional sliding supports to hold said platform above said stator base;

two electronic rulers for scaling the real position of the platform;

traditional supporting means for holding the platform at a distance above the stator base;

a computer and software for generating motion command signal to PWM generator;

a PWM current generator for energizing the coils of the moving platform;

when a reference data (the final position of the platform) is input into the computer, the computer will give command to the platform and make it moving; once the platform is in moving, the electronic rules continuously detect and transfer the location data of said platform to the computer; the computer continuously compares the data sent by said rules with reference data and gives command to the platform until said two kinds of data are equal.

In the planar motor according to the present invention, said bricks may be formed by stacking a plurality of laminated steel sheets.

In the planar motor according to the present invention, said stator base may be formed by jogging a plurality of said laminated steel bricks into a phalanx with evenly distributed raised square blocks, and the whole phalanx is glued on a base-plate with epoxy glue.

In the planar motor according to the present invention, said stator base may be formed by jogging a plurality of said laminated steel bricks into a phalanx with evenly distributed raised square blocks, and the whole phalanx is fixed in position by a locating-plate by press-fit.

In the planar motor according to the present invention, said each row of spaced coil-shoes has three in number, they are so spaced that when one of said coil-shoes is fully aligning with corresponding blocks of the stator base, the other two coil-shoes are out of alignment with corresponding blocks in such a condition that one will move left when activated and one will move right when activated.

In the planar motor according to the present invention, said each coil can be independently activated or deactivated.

In the planar motor according to the present invention, each two of said coils can be activated simultaneously by equal or unequal currents to produce two equal or unequal forces, and the resultant force will be adjustable for causing different acceleration of the platform.

In the planar motor according to the present invention, said computer may be Pentium II or equivalent.

Instead of fabricating the stator base from a slab of steel sheet, this invention uses the LEGO block construction approach. The stator base is assembled together from a plurality of "laminated steel bricks" (bricks). The bricks consist of laminated silicon sheets and have standard size. So they can be cascaded onto each other to form the stator base of any shape and size. In this way, the construction of the VR planar motor is greatly simplified, and the manufacturing cost is drastically reduced. Furthermore, due to the short magnetic circuit paths of the flux decoupled coils on the moving platform, the gaps between the bricks will have negligible effect on the overall performance of the planar motor.

To sum up, this innovative approach has the advantages of:
  (i) Easy manufacturing—since there is no need for large surface metal cutting,
  (ii) Flexible structure—different sizes of stator base can be constructed from standardized bricks,
  (iii) Improved performance—Eddy current effect (magnetic flux turbulence flow) is reduced substantially, because the stator base is not made of solid metal and it is formed by bricks which are laminated.

DETAILED DESCRIPTION OF THE PREFERRED EMBODIMENTS

Figure 1:
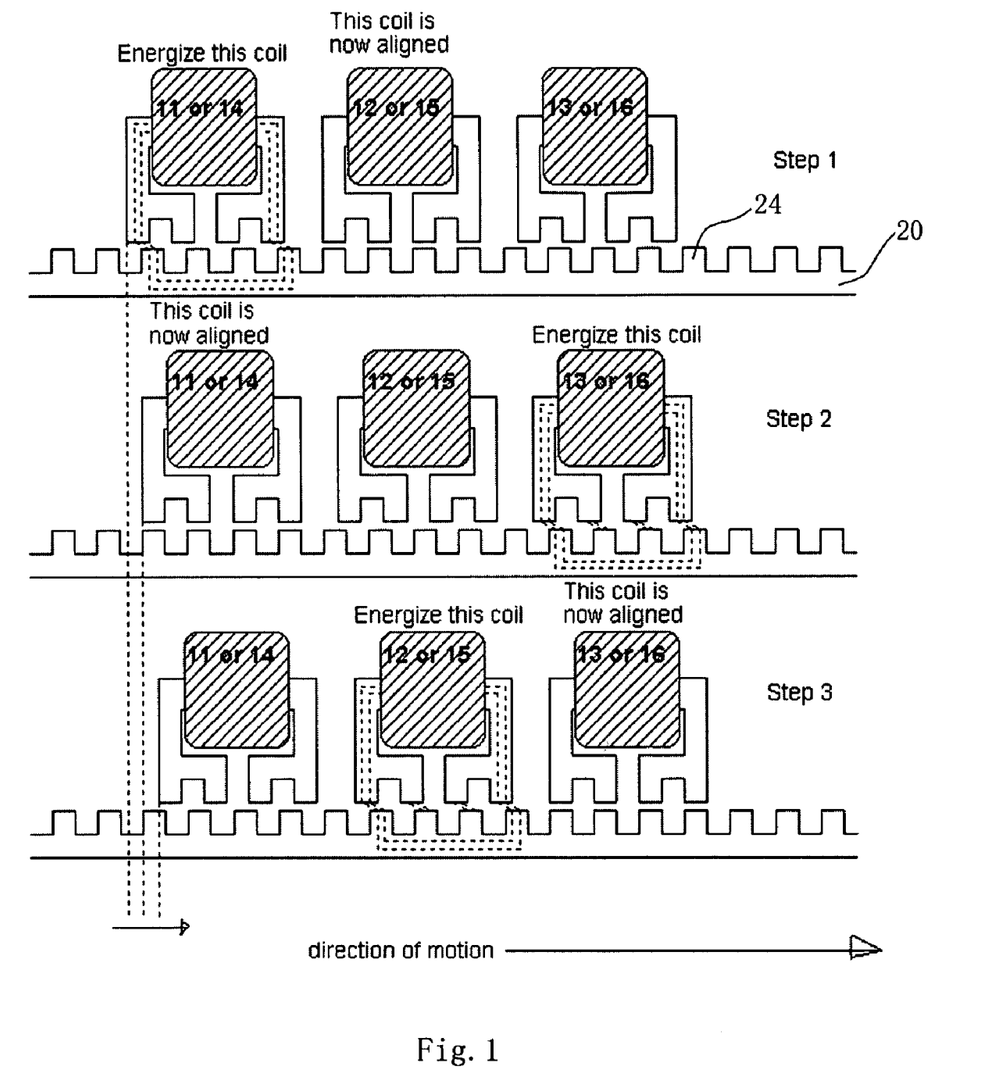
FIG. 1 is the working principle of this 2-D variable reluctance planar motor of this invention.

FIG. 1 shows the principle of 2-D variable reluctance planar motor of this invention. Unlike all prior arts, this invention uses no magnets. The pulling force comes solely from the magnetic flux generated from the current of the coils. For the planar motor invention, 3 coils 11, 12, and 13 are responsible for the X axis motion and another 3 coils 14, 15, and 16 for the Y axis motion. All 6 coils are decoupled and independent. The shape of the coil shoes allow the magnetic flux and force to be developed in a particular direction. Under this unique structure, the two force axes are virtually operating independently of each other. FIG. 1 shows that, by consecutively energizing the set of 3 coils, the moving platform can go forwards or backwards.

Figure 2A:
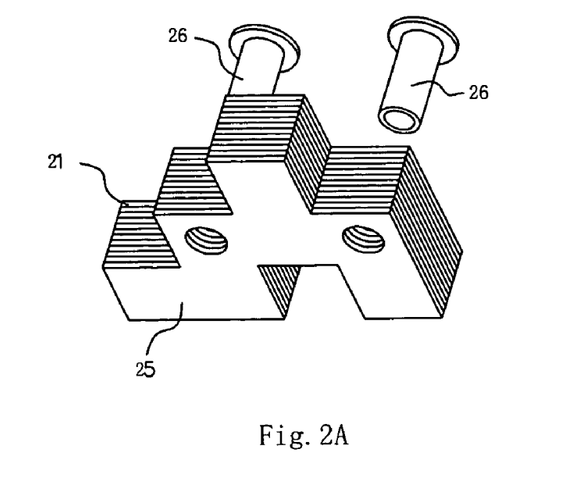
FIG. 2A to FIG. 2C are respectively a perspective view, a back view and a side view of the laminated steel brick, showing the silicon-steel sheet and the laminated steel brick made from said sheets.
Figure 2B:
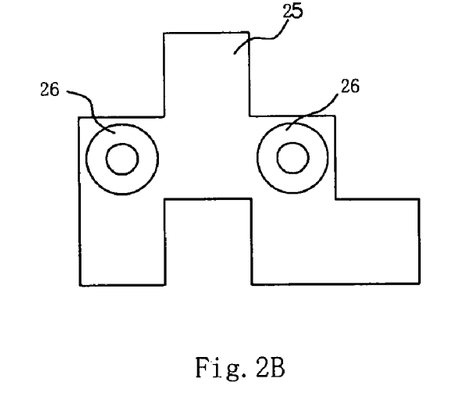
Figure 2C:
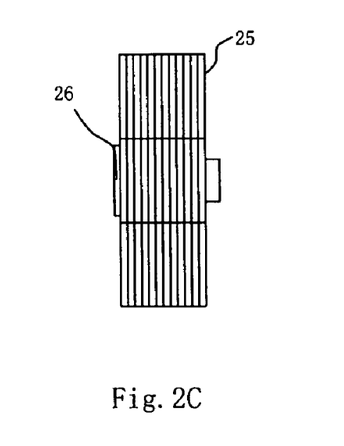
Figure 3A:
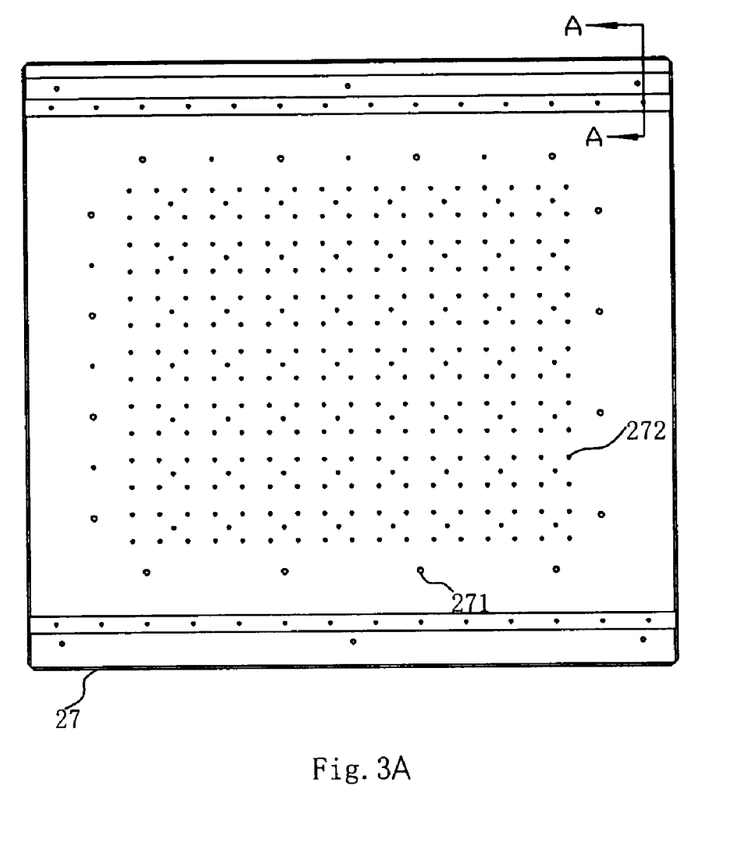
FIG. 3A is a front view of base-plate used for support the stator base.
Figure 3B:
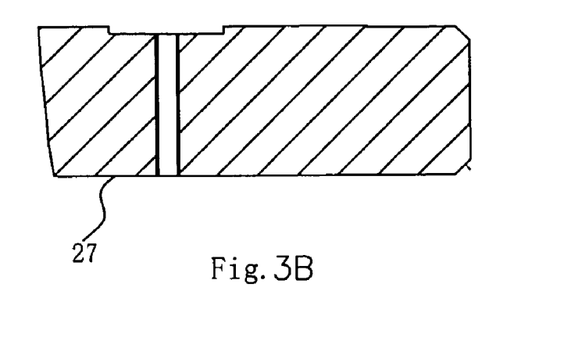
FIG. 3B is an enlarged cross-sectional view of the base-plate along line A—A in FIG. 3A.
Figure 3C:
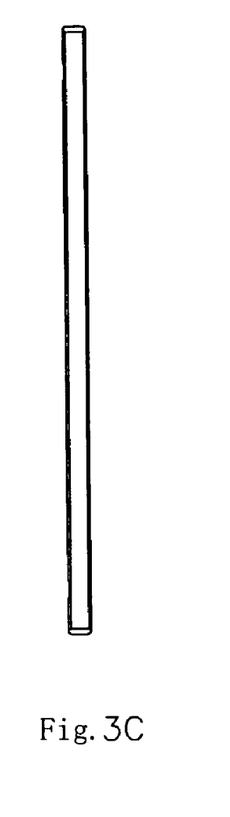
FIG. 3C is a side view of the base-plate of FIG. 3A.
Figure 3D:
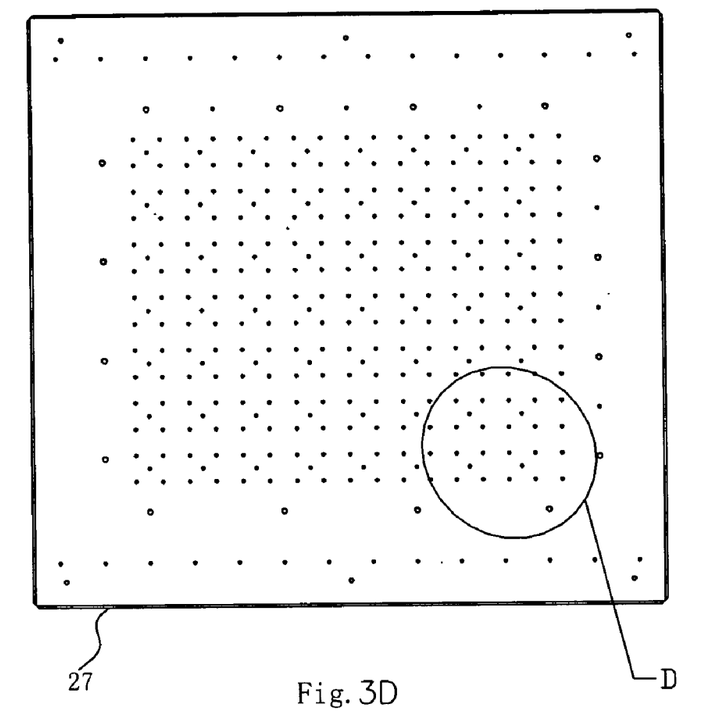
FIG. 3D is a back view of the base-plate of FIG. 3A.
Figure 3E:
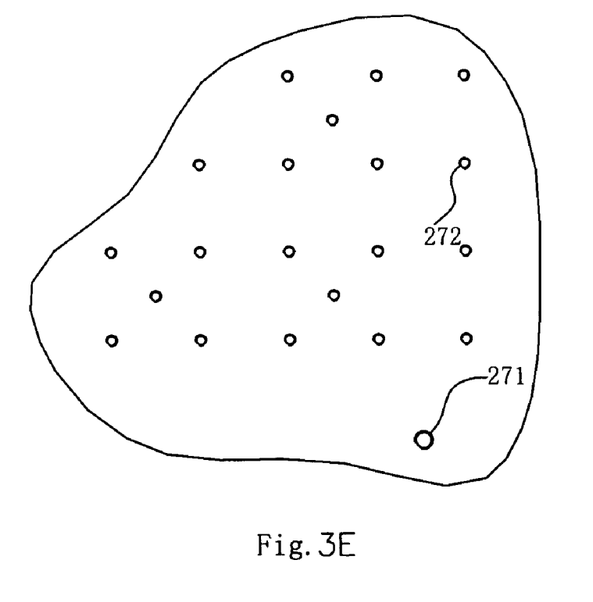
FIG. 3E is an enlarged view of portion D in FIG. 3D.
Figure 4A:
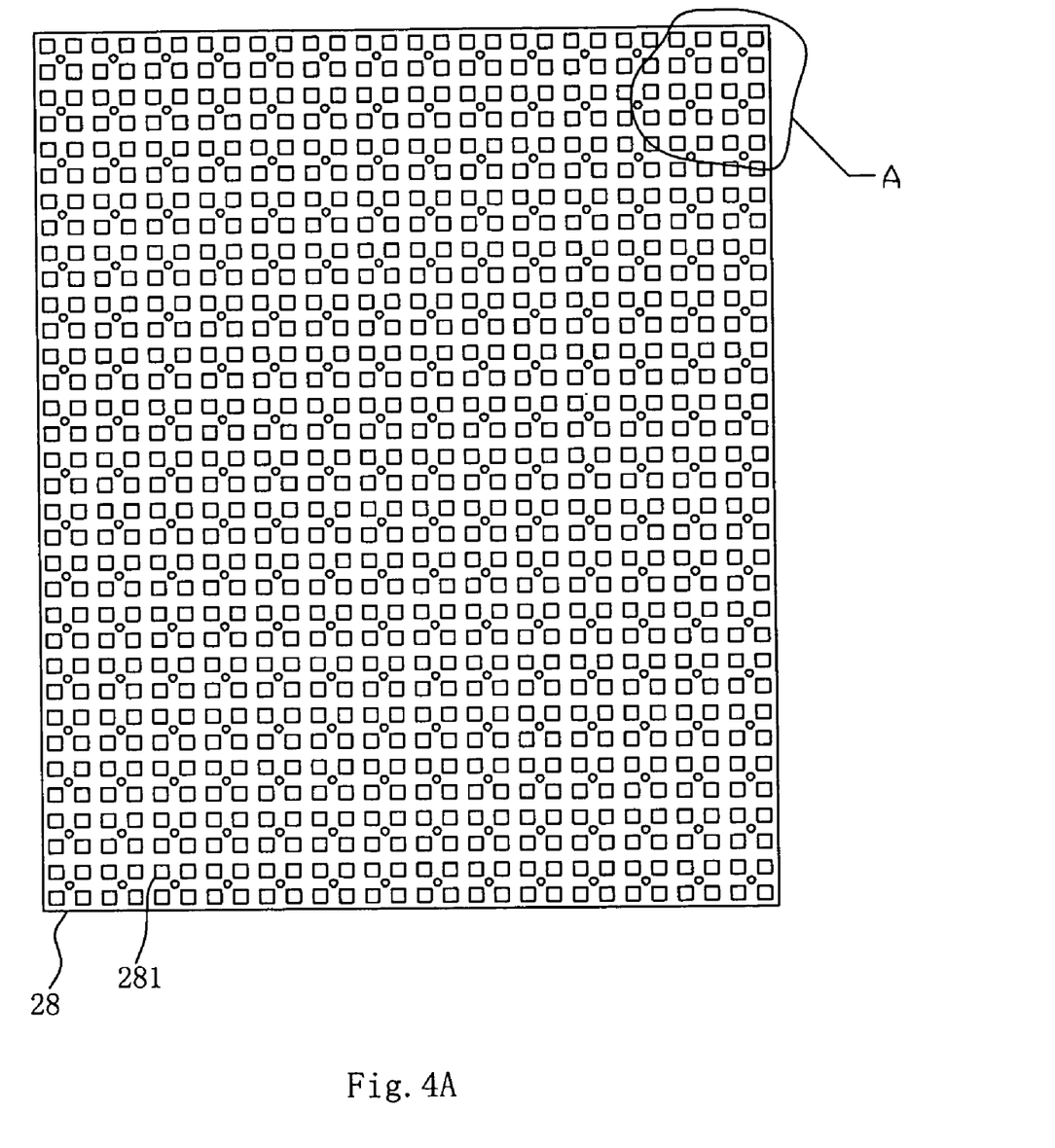
FIG. 4A is a drawing of locating-plate used for fixing all bricks in position.
Figure 4B:
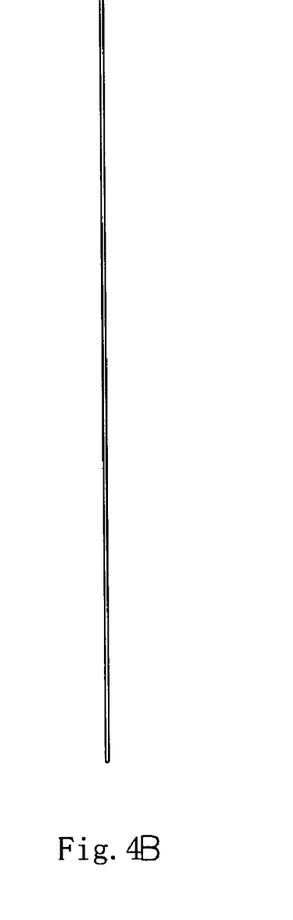
FIG. 4B is a side view of the locating-plate of FIG. 4A.
Figure 4C:
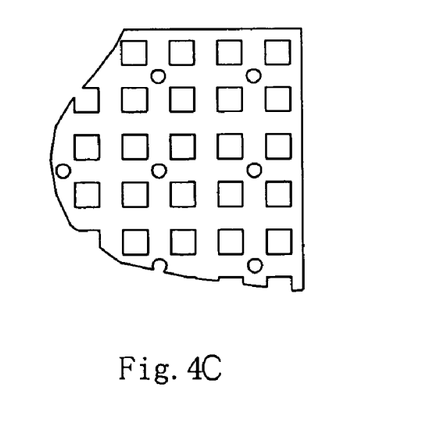
FIG. 4C is an enlarged view of portion A in FIG. 4A.

FIG. 2A to FIG. 2C are drawings for showing the silicon-steel sheet 21 and the laminated steel brick 25. The silicon-steel sheet 21 can be of a thickness less than 0.5 mm. A plurality of such silicon-steel sheets 21 can form a "laminated steel brick" (stacked and laminated silicon-steel sheets) 25. In this embodiment, two copper hollow rivets 26 are used to hold said brick 25 in shape. A plurality of such brick 25 can be jogged to form the stator base 20 (see FIG. 5A–FIG. 5C). Said stator base 20 is in the form of a table consisting of a phalanx of evenly distributed raised square blocks (or dents) 24. The stator base 20 is now not consisted of magnets or solid steel casting, but of square blocks 24 of magnetic-circuit bricks 25. A rigid aluminum base-plate 27 (see FIG. 3A to FIG. 3E) can be used to support said block-table and make all bricks firmly fixed on said base-plate and make bricks fixed with respect to each other. There are many holes 271, 272 for the fixation of the stator base 20 on the base-plate 27. The stator base 20 can be formed by spreading epoxy glue over pre-arranged bricks 25 on the rigid aluminum base-plate 27. Or a non-ferrite locating-plate 28 (for example, aluminum plate, see FIGS. 4A and 4C) with corresponding square holes 281 to receive the blocks 24 from the upper direction can be used for receiving blocks 24 by press-fit in order to fix all bricks 25 in position without glue. Since all silicon-sheets 21 are small in size and are mass produced from the same stamping mould, the total tooling and machining cost of the stator base is very low.

Figure 5A:
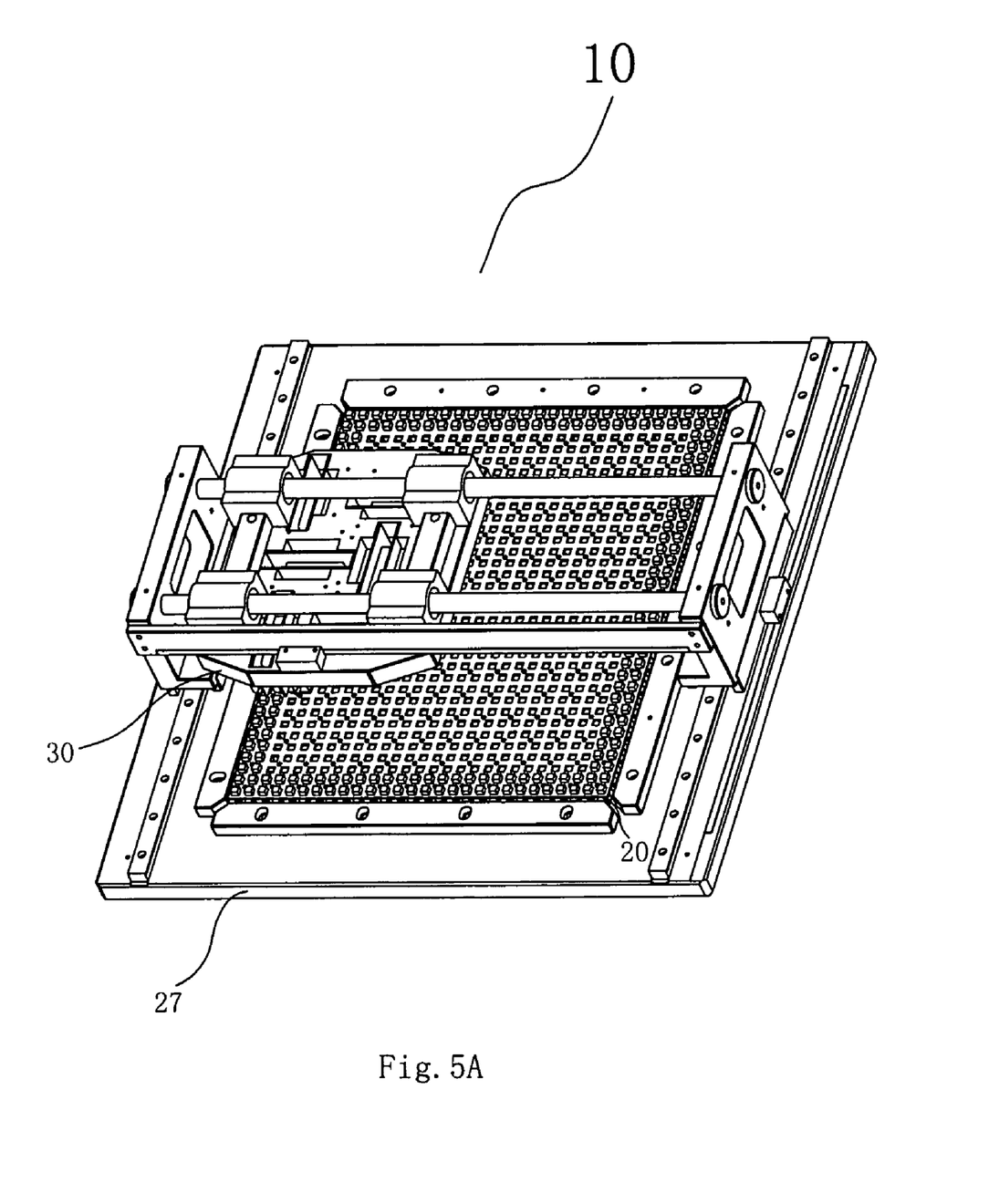
FIG. 5A is a constructional drawing of 2-D variable reluctance planar motor of this invention.
Figure 5B:
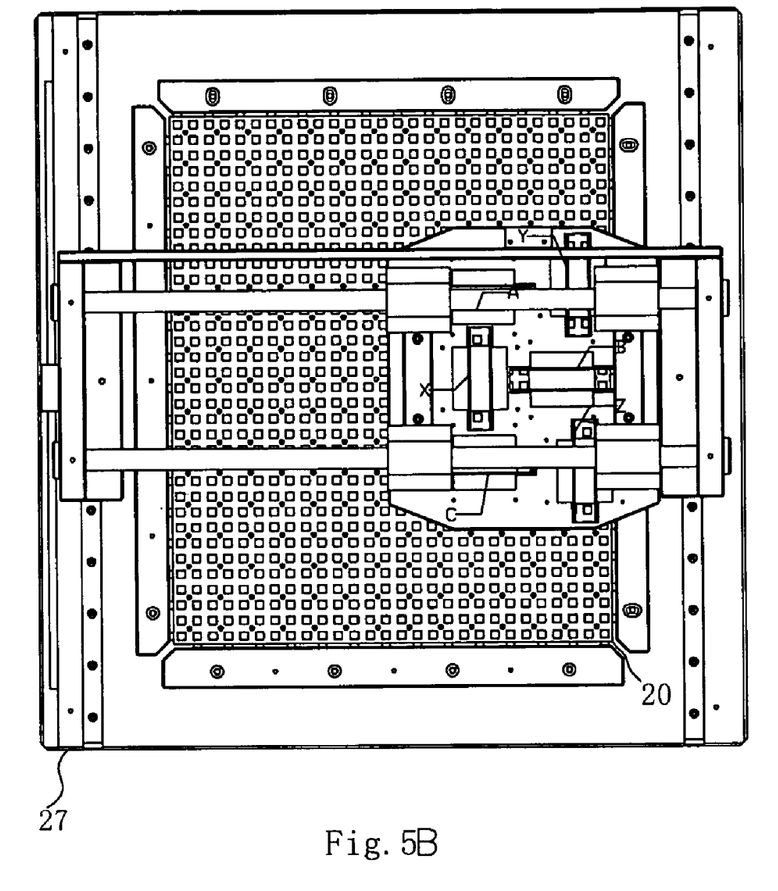
FIG. 5B is a top view of the planar motor of FIG. 5A.
Figure 5C:
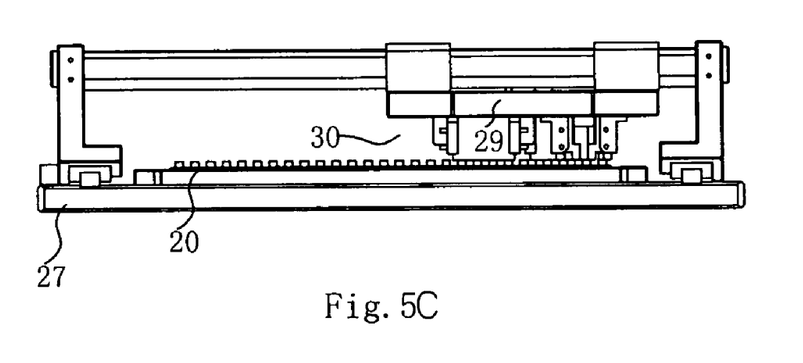
FIG. 5C is a front view of the planar motor of FIG. 5A.
Figure 6A:
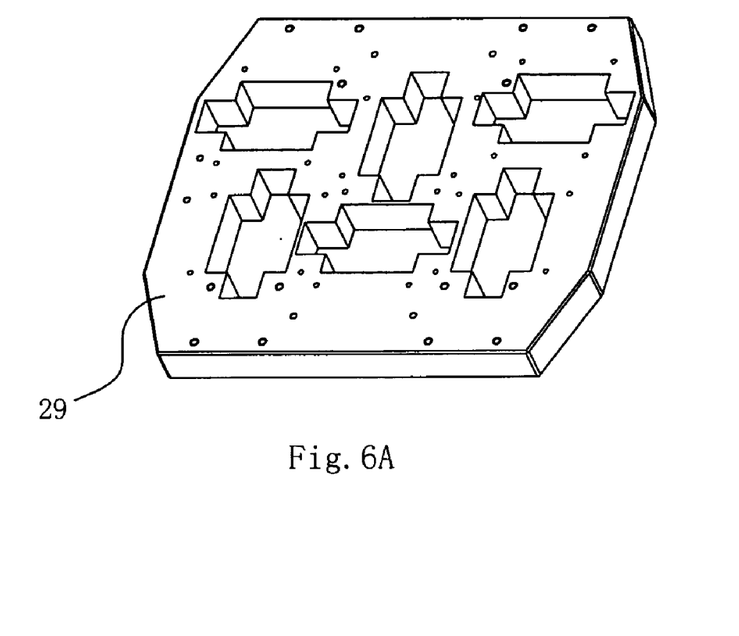
FIG. 6A is a drawing for moving-block used in this invention.
Figure 6B:
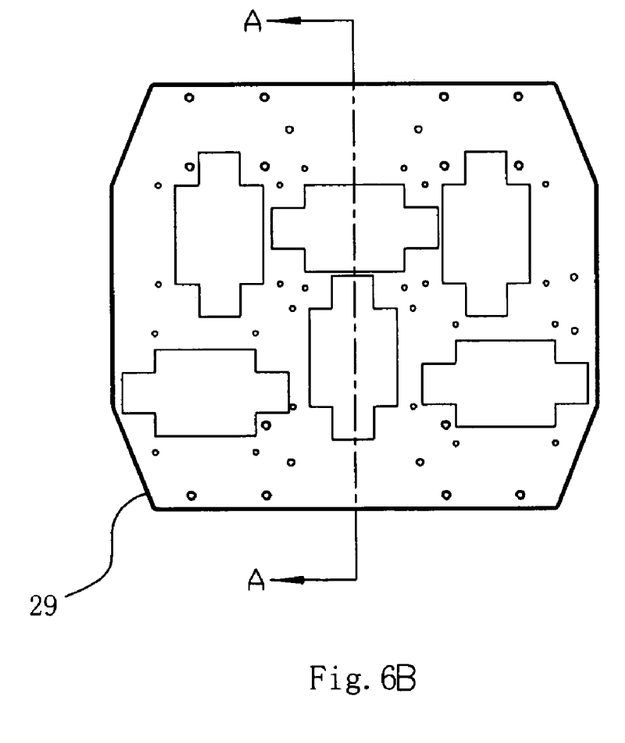
FIG. 6B is a top view of the moving-block of FIG. 6A.
Figure 6C:
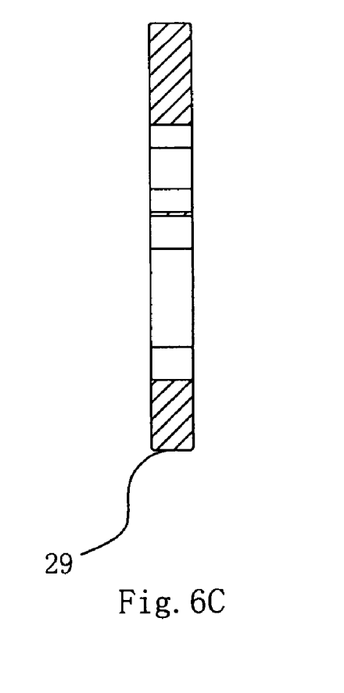
FIG. 6C is a cross-sectional view of the moving-block along line A—A in FIG. 6B.
Figure 6D:
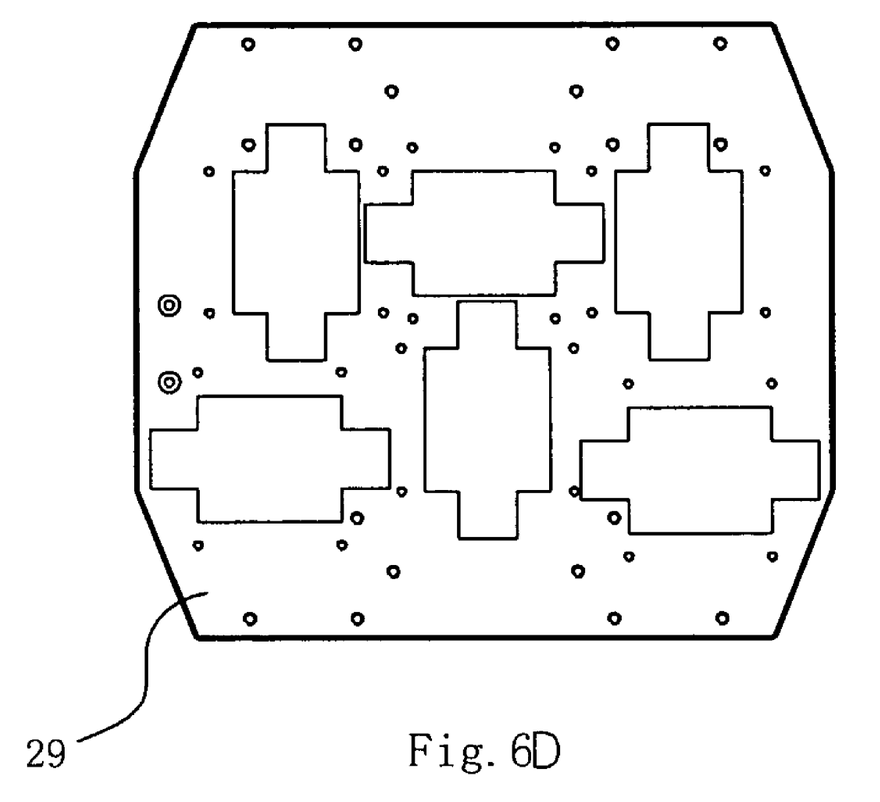
FIG. 6D is a bottom view of the moving-block of FIG. 6A.
Figure 6E:
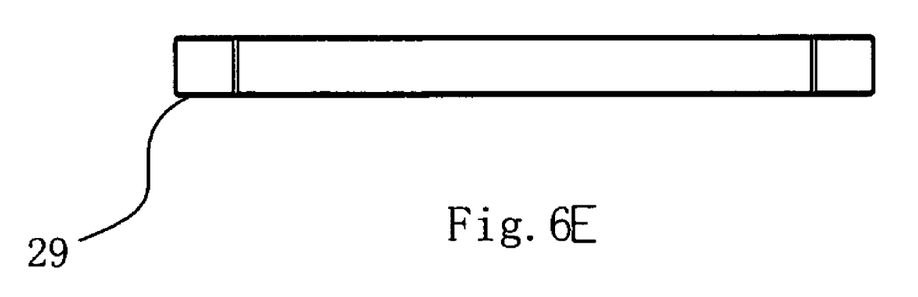
FIG. 6E is a front view of the moving-block of FIG. 6A.
Figure 7:
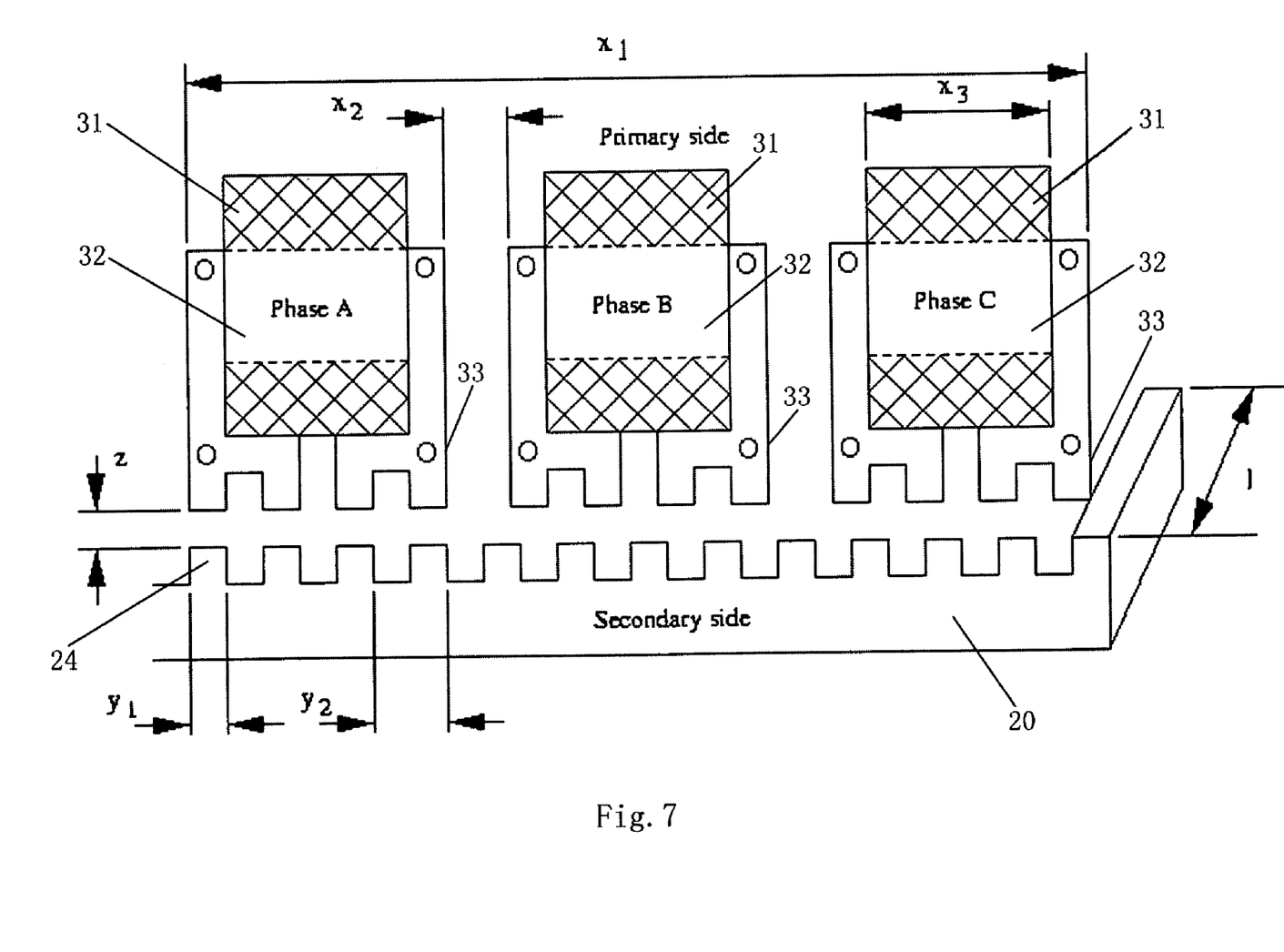
FIG. 7 is a sketch for showing how the coil-shoes aligning to the table-shoe.

FIG. 5A to FIG. 5C are the constructional drawings of the planar motor 10 of this invention. Similar to FIG. 1, there are coils 31 (in this embodiment, 3 coils are used for each direction, see also FIG. 6A to FIG. 6E and FIG. 7), cores 32 and shoes 33 in the moving platform (i.e. the rotor) 30. FIG. 6A to FIG. 6E shows a moving-block 29 which is used to carry all six coils for showing the arrangement of coils. In fact, the platform 30 has two sets of coils 31, cores 32 and shoes 33. One set (A, B, C) is used for X-axis and the other set (X, Y, Z) is used for Y-axis. Since the space between each neighboring shoes 33 and between each neighboring blocks 24 are different, if the activated left shoe 33 is aligned with a block 24 as shown in FIG. 7, the central and right shoe 33 will not align with their respective blocks 24. Therefore, if the left shoe 33 is now not activated and the right shoe 33 is activated, the whole platform 30 will move right for aligning. For the same reason, if the left shoe 33 is not activated and the central shoe 33 is activated instead, the whole platform 30 will move left.

In practice, since the coils 31 are independently activated, any coil 31 of a set can be activated in any time. In this invention the activating current of all the coils are controlled by a computer. Depending on the relative position of blocks 24 and shoes 33, the computer will supply a right-mix of currents to the three individual coils 31 to achieve an overall smooth forward force or backward force. In common case, the acceleration and deceleration rate could be controlled from 0 to 2 g.

The following table 1 for the mechanical dimensions of motor in FIG. 7 is for example purpose only; it is not a limitation of this invention.

TABLE 1

| Motor mechanical dimensions | |
|---|---|
| Pole width ($y_1$) | 5 mm |
| Pole pitch ($y_2$) | 10 mm |
| Motor length ($x_1$) | 121.666 mm |
| Phase separation ($x_2$) | 8.333 mm |
| Winding length ($x_3$) | 15 mm |
| Winding width ($l$) | 25 mm |

TABLE 1-continued

Motor mechanical dimensions

| | |
|---|---|
| Air gap width (z) | 0.5 mm |
| Number of turns per phase | 159 |

Two electronic rules (see FIG. 8, any prior art electronic rule with accuracy better than 0.001 mm can be used) are placed in two directions for detecting the real position of the platform 30. Thus, per detecting position signals, the computer will give suitable current to related coils. Therefore, in this invention, the working accuracy is not depending on the mechanical accuracy of components as prior arts, but depending on the computer and software. In doing so, any old-style computer can be used. For example, 386 computers will be sufficient. Since the software must be compiled by the end-user and can not be patented by this application, the inventor will submit a suitable separate application hereafter.

Figure 8:
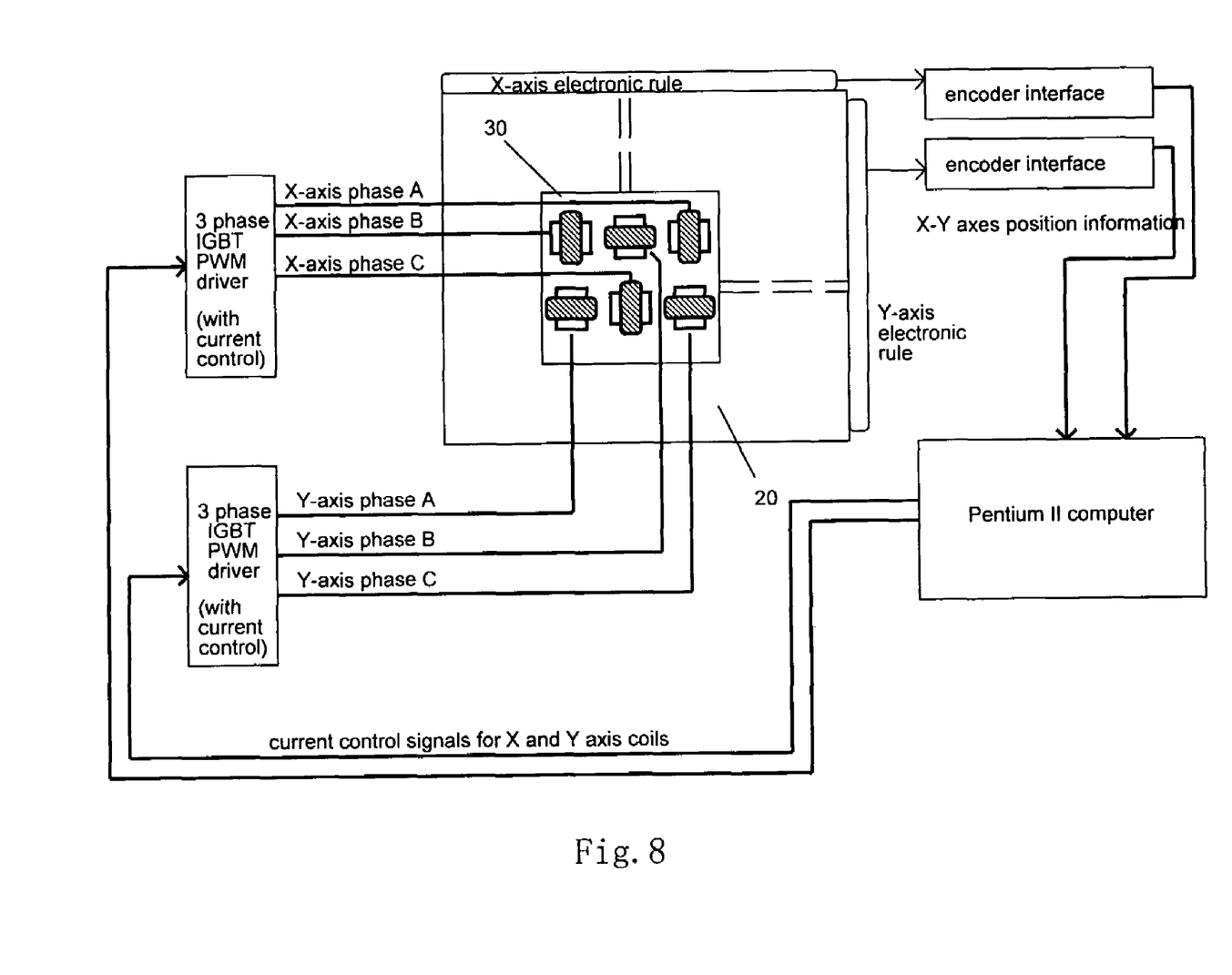
FIG. 8 is a block diagram of this invention for showing how this invention works.

FIG. 8 is a block diagram of this invention for showing how this invention works. As shown in this block diagram on upper right corner, encoders interface circuits are used to receive signals from the linear encoder scales (or the electronic rules) and to convert them into X and Y absolute positions. The X and Y postion information will be fed into the computer to calculate the amount of current output to the coils of the moving platform. As shown in this block diagram on left side, two sets of 3-phase IGBT devices are used to convert small command signals to high current Pulse-Width Modulation (PWM) driving signals. As shown in this block diagram on right side, the Pentium computer (or any 386 based computers) is the main controller for this motor.

Simply speaking, in this invention, the precision is not ensured by "hardware", but by "software". In prior arts, computer only simply sent out pulse signals, then, precision step motor should be used for converting each said signal into an angular displacement. Then, said angular displacement is converted by a lead-screw into a linear displacement. Therefore, in prior arts, the computer plays a very simple role and the step motor and the lead-screw play an important role. While in this invention, the computer plays an important role while other mechanical parts playing a very simple role. Therefore, the precision of said mechanical parts is no more important. The X-Y positions of the platform are detected by electronic rules (which are now very common). The location of the platform is continuously reported by said rules to the computer. Then the computer compares the reported data with reference data and continuously gives commands to the platform and makes it moving or stopping. Therefore, the air-gap (Z-position) between the platform and the stator base is now no more a dominant factor to the location precision as in prior arts. The variation of air-gap only affects the acceleration value of the platform. Since the acceleration value is now automatically controlled by the computer, any expensive air-cushion construction used in prior arts is now not necessary in this invention. This will obviously reduce the cost.

The principle and main parts of this invention had been disclosed above. For carrying out this invention, traditional sliding guides used to hold said platform above said stator base for letting said platform slide to and fro over said stator base, traditional electronic rulers for scaling the real position of the platform, traditional supporting means for holding the platform at a distance above the stator base, traditional computer and self-compiled software for generating pulse signal to a generator, and current generator for generating pulsed current to the platform are necessary. Since they are all prior arts, no detailed description for them is in need.

What is claimed is:

1. A two-dimensional variable reluctance planar motor, comprising:

a stator base including a plurality of laminated steel bricks;

a moving platform including two rows of spaced coil-shoes and coils;

sliding supports for holding the platform above the stator base;

two electronic rulers for scaling the real position of the platform;

supporting means for holding the platform at a distance above the stator base;

a PWM current generator for energizing the coils of the moving platform; and a computer having software for generating motion command signals to the PWM generator;

wherein, when a reference data is input into the computer, the computer transmits a command to the PWM generator to move the platform, as the platform moves, the electronic rules continuously detect and transfer location data of the platform to the computer, the computer continuously compares the data sent by the rules with the reference data and continues to transmit commands for moving the platform until the location data is equal to the reference data.

2. The planar motor according to claim 1, wherein the bricks are formed by stacking a plurality of laminated steel sheets.

3. The planar motor according to claim 1, wherein the stator base is formed by jogging a plurality of the laminated steel bricks into a phalanx with evenly distributed raised square blocks, and the whole phalanx is glued on a base-plate with epoxy glue.

4. The planar motor according to claim 1, wherein the stator base is formed by jogging a plurality of the laminated steel bricks into a phalanx with evenly distributed raised square blocks, and the whole phalanx is fixed in position by a locating-plate by press-fit.

5. The planar motor according to claim 4 wherein each row of spaced coil-shoes includes three coil shoes spaced such that when a one of the coil-shoes is fully aligned with corresponding blocks of the stator base, two remaining coil-shoes are out of alignment with corresponding blocks, whereby a first of the remaining coil-shoes moves left when activated and a second of the remaining coil-shoes moves right when activated.

6. The planar motor according to claim 5 wherein the each coil can be independently activated or deactivated.

7. The planar motor according to claim 5 wherein two of the coils can be activated simultaneously by equal or unequal currents to produce two equal or unequal forces, and the resultant force will be adjustable for causing different acceleration of the platform.

8. The planar motor according to claim 1, wherein the computer is Pentium II or equivalent.

* * * * *